(12) United States Patent
Roos et al.

(10) Patent No.: US 7,954,691 B2
(45) Date of Patent: Jun. 7, 2011

(54) METHOD FOR JOINING TUBE PLATES AND TUBES AS WELL AS FRICTION TOOL TO CARRY OUT THE METHOD

(75) Inventors: Arne Roos, Juliusburg (DE); Jorge Dos Santos, Tespe (DE); Georg Wimmer, Tüssling (DE)

(73) Assignees: Linde Aktiengesellschaft, Munich (DE); GKSS-Forschungszentrum Geesthacht GmbH, Geesthact (DE)

( * ) Notice: Subject to any disclaimer, the term of this patent is extended or adjusted under 35 U.S.C. 154(b) by 38 days.

(21) Appl. No.: 12/341,144

(22) Filed: Dec. 22, 2008

(65) Prior Publication Data
US 2009/0159643 A1 Jun. 25, 2009

(30) Foreign Application Priority Data
Dec. 21, 2007 (DE) .......................... 10 2007 063 075

(51) Int. Cl.
*B23K 20/12* (2006.01)
(52) U.S. Cl. ...................................... 228/112.1; 228/2.1
(58) Field of Classification Search ............... 228/112.1, 228/2.1
See application file for complete search history.

(56) References Cited

U.S. PATENT DOCUMENTS

| | | | | |
|---|---|---|---|---|
| 6,669,075 B2 * | 12/2003 | Colligan | ........................ | 228/2.3 |
| 7,097,091 B2 * | 8/2006 | Okamura et al. | .......... | 228/112.1 |
| 7,270,257 B2 * | 9/2007 | Steel et al. | ..................... | 228/2.1 |
| 2005/0116012 A1 * | 6/2005 | Packer et al. | .............. | 228/112.1 |
| 2006/0260376 A1 * | 11/2006 | Osame | ........................... | 72/269 |
| 2007/0138237 A1 | 6/2007 | Nishikawa et al. | | |

FOREIGN PATENT DOCUMENTS

| | | |
|---|---|---|
| CH | 318030 | 12/1956 |
| DE | 205 357 | 12/1983 |
| DE | 4225435 A1 | 2/1994 |
| GB | 2 306 366 A | 5/1997 |
| JP | 6156789 | 6/1994 |
| JP | 2007-144479 A | 6/2007 |
| WO | WO-99/52669 A1 | 10/1999 |

OTHER PUBLICATIONS

Honda Motor Co. Ltd., "Tool for Friction Stir Joining and Friction Stir Joining Method Using the same," Patent Abstracts of Japan, Publication Date: Jun. 14, 2007; English Abstract of JP2007-144479.

(Continued)

*Primary Examiner* — Roy King
*Assistant Examiner* — Michael Aboagye
(74) *Attorney, Agent, or Firm* — Millen, White, Zelano & Branigan, P.C.

(57) ABSTRACT

The invention relates to a method for the joining of tube plates (10) and tubes (11) in a tube bundle heat transfer device with the help of a rotating friction tool. Here, the friction tool is rotatingly moved into the open end of a tube (11) surrounded by the tube plate (10) in the axial direction of said tube and pressed against the face of the tube (11) in the manner that the tube end (12) and the region of the tube plate (10) surrounding the tube end are plasticized and merge into a weld joint.

16 Claims, 2 Drawing Sheets

OTHER PUBLICATIONS

Kuka Schweissanlagen & Roboter, "Appts. For friction welding two components having different cross-sectional contours—with an annular support surrounding (with an initial clearance) the tubular component," Publication Date: Feb. 10, 1994, Retrieved from Ep.Espacenet.com on Apr. 30, 2010; English Abstract of DE4225435.

Franz U, "Friction weld prodn. Between partially telescoped workpieces—by rotating friction ring applied under pressure to stationary joint," Derwent WPI, Publication Date: Jun. 30, 1982; English Abstract of DD205357.

Mita Industrial Co. Ltd., "Conveyance mechanism for manuscript reading device," Publication Date: Jun. 3, 1994; English Abstract of JP61-56789.

* cited by examiner

METHOD FOR JOINING TUBE PLATES AND TUBES AS WELL AS FRICTION TOOL TO CARRY OUT THE METHOD

The invention relates to a method for the joining of tube plates and tubes in a tube bundle heat transfer device with the help of a rotating friction tool.

Heat transfer devices are devices wherein the heat of a medium is passed on to another in that for example a first medium flows through a quantity of tubes which are located in the second medium and which second medium thus likewise flows around said tubes. To make this possible, the first medium usually flows through a multiplicity of tubes which are enclosed in a vessel or cylinder with inflow and outflow for the second medium. If the first medium for example is cooling water which has been greatly heated while cooling a plant the second medium for example can be air or oil which in another location is used for heating. The tubes through which the first medium is directed are generally held in tube plates at a minor distance relative to one another while the tube plates proper are carried by the jacket or cylinder of the heat exchanger. Generally the tubes are fastened in the tube plates through rolling and flanging over, which at the start of operation generally suffices for the operating conditions that prevail at that time. During the course of further operation of the heat exchanger and the temperature and vibration loads that develop in the process, these joints partially disintegrate and then no longer satisfy the tightness requirements. Replacement or expensive repair with corresponding downtimes of the plant is the consequence.

For this reason, tubes have already been welded into the tube plates by means of YAG lasers which requires elaborate process checks and process control. Gasification in the weld seam nevertheless occurred in the process which resulted in a formation of pores. A further disadvantage of this laser welding method consists in that because of the low ductility in the laser-welded seam region quite a large welding-in depth of approximately 0.8× tube thickness is required. This welding-in depth however cannot be achieved with the YAG laser in all configurations. Since because of the required welding speeds and the narrow radii of the geometries that form the base, no filler material can be used for the work, a satisfactory result with a YAG laser welding method will not be achievable in the foreseeable future.

A further known welding method is the MIG method, by means of which a visually attractive appearance of the welded seams can be achieved. Because of the complex heat control however, stress cracks that reach as far as just under the surface of the MIG seam occur time and again which impair the integrity of the construction. Generally, the high-melting oxide skins present on the aluminium workpiece are an obstacle to the fusion welding methods since these first have to be melted before a satisfactory joint is achieved. The difference in the melting temperature of aluminium with approximately 660° C. and the oxides with approximately 2050° C. requires melting of the oxides which as diffusion barrier can otherwise prevent the welding. The high energies required for this however have a negative influence on the lower-melting alloy components of the materials to be welded. As a consequence, strength losses or instances of hardening occur in the seam region.

A method for the manufacture of a friction weld joint is known from DD 205 357 wherein for example tube plates for heat exchangers are manufactured. For this purpose, the parts to be joined are securely locked and in the region of the seam to be welded, heated and welded with the help of a rotating friction ring generating the welding heat. The friction ring used here serves as filler material and can be embodied variously in cross section depending on the welding task to be performed. This results in the consumption of the friction ring as part of the friction tool.

From US 2007/013 8237 a method for the welding of the tube ends of heat exchanger tubes in tube plates is known, wherein variously shaped friction tools act on the tube ends, welding these through heating. To this end, in an embodiment the cylindrical friction tool has the same diameter as the tube to be welded. In another embodiment the diameter of the friction tool is smaller than the outer diameter of the tube to be welded, but greater than its inner diameter. In yet other embodiments the face of the cylindrical friction tool has profilings with which the tube is contacted.

The object of the invention is to create a method for the joining of tube plates and tubes in a tube bundle heat transfer device and a friction tool that is suitable for this purpose which are improved compared with the prior art.

The method of the type mentioned at the outset serves to solve this object, which method is characterized in that the friction tool is rotatingly moved into the open end of a tube surrounded by the tube plate in its axial direction and pressed against the face of the tube in the manner that the tube end and the region of the tube plate surrounding the tube end are plasticised and merge with each other in a welded joint.

The friction tool to carry out the method is characterized by a shank which at its free end not intended for clamping comprises a cylindrical friction pin which is not consumed during the friction welding and by a collar following the friction pin with larger outer diameter than the friction pin and with a shoulder which forms the transition from the collar to the friction pin.

According to the invention a friction tool is initially created in a form specific to the respective application and provided with a profiling which is adapted to the respective material pairing. The friction tool with its cylindrical friction pin is then moved into a free tube end and put into rapid rotation as is usual for friction stir welding and thus known to the person skilled in the art. Through further inward movement of the friction pin in the free tube end which is not shown a shoulder provided with profilings finally comes in contact with the free tube end and in the process generates such a high friction heat that the free tube end and the surrounding region of the tube plate are plasticized and merge into a circular joint.

The invention is explained in more detail in the following by means of a drawing. It shows:

BRIEF DESCRIPTION OF DRAWINGS

FIG. 1 shows a detail from a tube plate 10 in which a tube 11 is inserted and held with a slight projection to the top. In the free end of the tube 11 a friction tool is inserted which at the upper end comprises a shank 1 for the clamping in the welding spindle of a friction stir welding machine not shown. On the opposite lower end a cylindrical friction pin 2 is provided which in operation is moved into the free end of the tube 11. It is clear to the person skilled in the art that to this end the outer diameter of friction pin 2 and inner diameter of the tube 11 have to be adapted.

Figure 1:
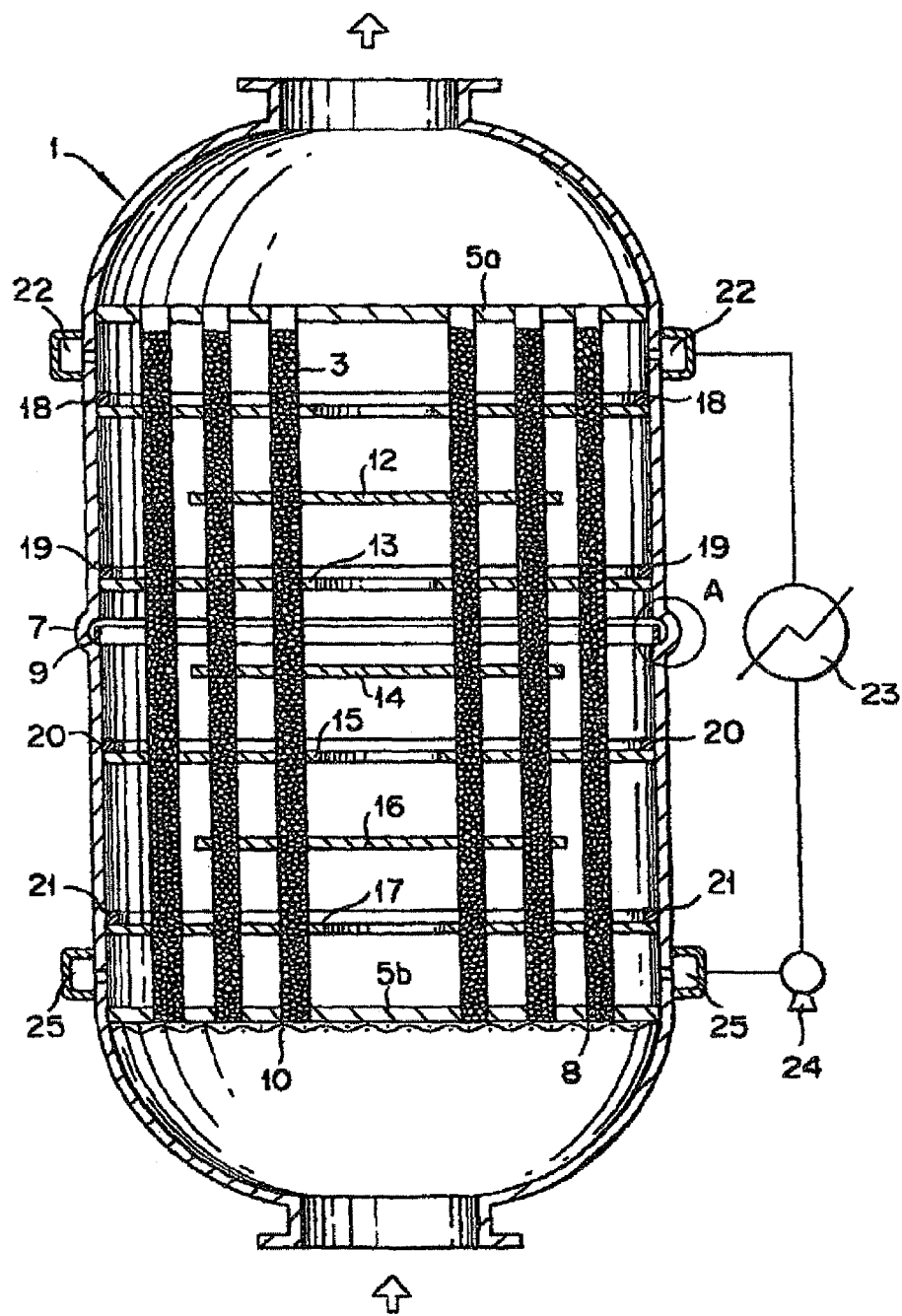
FIG. 1 a detail of a tube plate with tube and friction tool inserted in the tube end.
Figure 2:
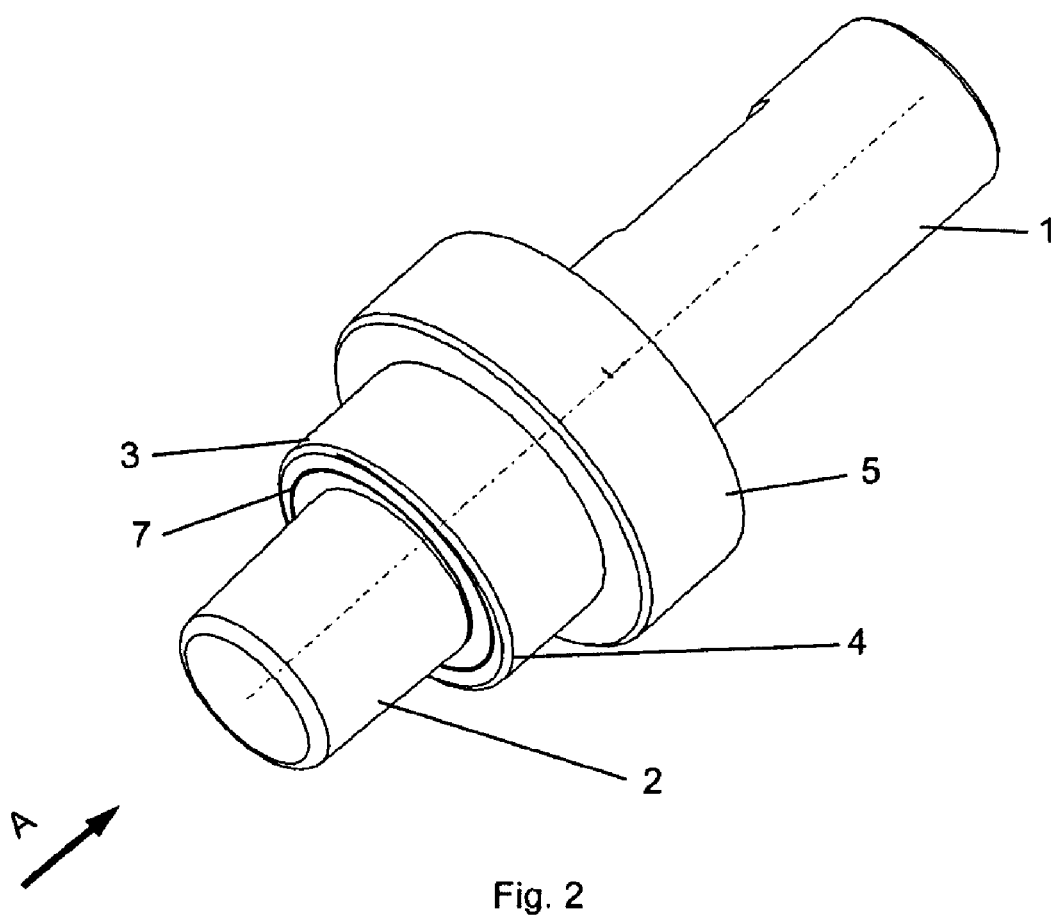
FIG. 2 a perspective representation of the friction tool from FIG. 1.

Between the friction pin 2 and the shank 1 are arranged a first collar 3 and a second collar 5 which differ in their outer diameter, specifically in the manner that the outer diameter of the first collar 3 is larger than the outer diameter of the friction pin 2 and the outer diameter of the second collar 5 is larger than the outer diameter of the first collar 3. In this manner the first collar 3 forms a first axially directed shoulder 4 at the transition to the friction pin 2 and a second shoulder 6 at the transition to the second collar 5.

The second shoulder 6 however normally has no function during welding. It could therefore also be shaped conically or crowned. With the annular surface which runs parallel to the second shoulder 6 but at a distance above said shoulder the tool supports itself on the welding spindle which is not shown.

With the first shoulder 4 the friction tool upon rotation for example in the direction of the arrow X contacts the face 12 of the tube 11 and in the process generates such a great heat through friction that the material of the tube 11 is plasticised in the region of the face 12. Since the radial extension of the first shoulder 4 is greater than the outer diameter of the tube 11, the first shoulder 4 additionally contacts the region of the tube plate 10 which lies in the neighbourhood of the tube 11 and likewise plasticises this region through heat which is generated during the friction process so that the two plasticised parts 10 and 11 join and form a weld seam.

Figure 3:
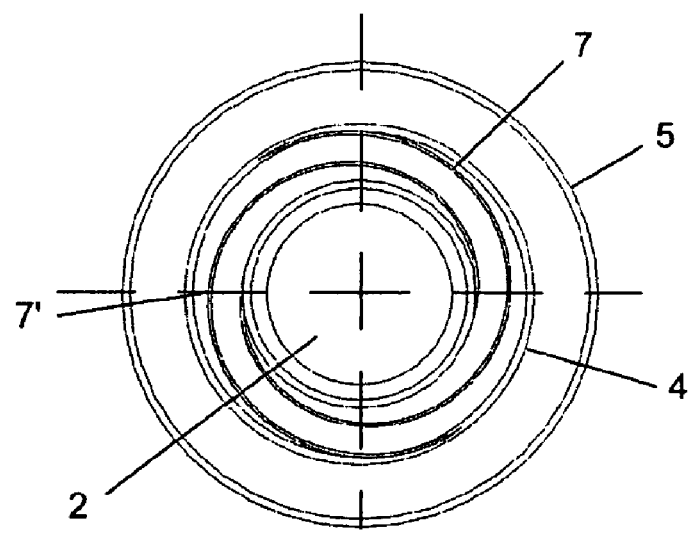
FIG. 3 a face view of the friction tool from FIG. 2 viewed in the direction of the arrow A.

For better heat generation in the region of the weld seam to be formed and thus for the faster plasticising of tube plate 10 and tube 11 the first shoulder 4 is provided with profilings, for example in form of one or a plurality of slots which run in the form of a spiral having a semi-circular, triangular or rectangular cross section. With the exemplary embodiment according to FIG. 3 two spiral-shaped slots are noticeable which are offset relative to each other and run from the inside to the outside, i.e. from the outer diameter of the cylindrical friction pin 2 to the outer diameter of the first collar 3.

The friction pin 2 serves for both the supporting and also the further heating of the tube through friction. Ideally the friction pin first comes in contact with the interior of the tube 11. Thus the conical shaping of the friction pin. After this, the shoulder 4 heats and plasticises the transition of tube 4 and plate 11. The aluminium deposited both on the shoulder 4 as well as on the friction pin 2 during the tests shows that the friction pin 2 is also involved in the friction process.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102007063075.3, filed Dec. 21, 2007, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for joining tubes to a tube plate (10) having a plurality of parallel holes and tubes (11) in a tube bundle of a heat transfer device, said method comprising passing said an open end of at least one tube (11) through a hole of said tube plate, providing a rotatable friction tool, moving the rotatable friction tool rotatably into said open end of said at least one tube (11) surrounded by the tube plate (10) in an axial direction of said at least one tube and pressing against an inner face of the at least one tube (11) with sufficient force that the at least one tube end (12) and the region of the tube plate (10) surrounding the at least one tube end are plasticized and merge into a weld joint.

2. The method according to claim 1, wherein the friction tool comprise a shank (1) which comprises a cylindrical friction pin (2) which is not consumed during the friction welding and by a collar (3) which follows the friction pin (2) with a greater outer diameter than the friction pin (2) and a shoulder (4) which forms the transition from the collar (3) to the friction pin (2).

3. The method according to claim 2, wherein the shoulder (4) of the collar (3) of the used friction tool is provided with at least one profiling (7).

4. The method according to claim 3, wherein the profiling (7) in the shoulder (4) of the used friction tool is concave viewed from the friction pin (2).

5. The method according to claim 4, wherein the profiling (7) in the shoulder (4) of the used friction tool is semi-circular, rectangular or triangular in cross section.

6. A method according to claim 1, comprising passing a plurality of tubes in a direction perpendicular and through the face of said tube plate (10) so as to provide open ends of the tubes adjacent an opposite face of said tube plate before said moving of said friction tool.

7. A method according to claim 2, comprising passing a plurality of tubes in a direction perpendicular and through the face of said tube plate (10) so as to provide open ends of the tubes adjacent an opposite face of said tube plate before said moving of said friction tool.

8. A method according to claim 3, comprising passing a plurality of tubes in a direction perpendicular and through the face of said tube plate (10) so as to provide open ends of the tubes adjacent an opposite face of said tube plate before said moving of said friction tool.

9. A method according to claim 4, comprising passing a plurality of tubes in a direction perpendicular and through the face of said tube plate (10) so as to provide open ends of the tubes adjacent an opposite face of said tube plate before said moving of said friction tool.

10. A method according to claim 5, comprising passing a plurality of tubes in a direction perpendicular and through the face of said tube plate (10) so as to provide open ends of the tubes adjacent an opposite face of said tube plate before said moving of said friction tool.

11. A method according to claim 6, wherein said plurality of tubes have parallel open ends.

12. In a method for producing a heat exchanger comprising a tube bundle, said method comprising enclosing within a vessel different and separated flow paths for different fluids, at least one flow path being comprising tubes and a tube plate, the improvement wherein an open end of a tube (11) and the tube plate (10) are connected by a method according to claim 1.

13. In a method for producing a heat exchanger comprising a tube bundle, said method comprising enclosing within a vessel different and separated flow paths for different fluids, at least one flow path being comprising tubes and a tube plate, the improvement wherein an open end of a tube (11) and the tube plate (10) are connected by a method according to claim 2.

14. In a method for producing a heat exchanger comprising a tube bundle, said method comprising enclosing within a vessel different and separated flow paths for different fluids, at least one flow path being comprising tubes and a tube plate, the improvement wherein an open end of a tube (11) and the tube plate (10) are connected by a method according to claim 3.

15. In a method for producing a heat exchanger comprising a tube bundle, said method comprising enclosing within a vessel different and separated flow path paths for different fluids, at least one flow path being comprising tubes and a tube plate, the improvement wherein an open end of a tube (11) and the tube plate (10) are connected by a method according to claim 4.

16. In a method for producing a heat exchanger comprising a tube bundle, said method comprising enclosing within a vessel different and separated flow paths for different fluids, at least one flow path being comprising tubes and a tube plate, the improvement wherein an open end of a tube (11) and the tube plate (10) are connected by a method according to claim 5.

* * * * *

UNITED STATES PATENT AND TRADEMARK OFFICE
CERTIFICATE OF CORRECTION

| | | |
|---|---|---|
| PATENT NO. | : 7,954,691 B2 | Page 1 of 1 |
| APPLICATION NO. | : 12/341144 | |
| DATED | : June 7, 2011 | |
| INVENTOR(S) | : Roos et al. | |

It is certified that error appears in the above-identified patent and that said Letters Patent is hereby corrected as shown below:

Column 5, line 6 reads "vessel different and separated flow path paths for different" should read -- vessel different and separated flow paths for different --

Signed and Sealed this
Second Day of August, 2011

David J. Kappos
*Director of the United States Patent and Trademark Office*